UNITED STATES PATENT OFFICE 2,531,464

DIHALOMETHYLBENZANTHRONES

David I. Randall and Saul R. Buc, Easton, Pa., assignors to General Aniline & Film Corporation, New York, N. Y., a corporation of Delaware No Drawing. Application April 30, 1949,
Serial No. 90,775

4 Claims. (Cl. 260—364)

This invention relates to a new process of preparing benzanthrone derivatives and to the new products obtainable thereby. More particularly it refers to the chloromethylation of benzanthrone and the product thereof.

It has heretofore been difficult to produce halogen methyl derivatives of benzanthrone. The 4,9-dihalomethyl derivative in particular has never been effected. Certain other halogen methyl derivatives have been made by difficult and indirect methods. One such method is disclosed in French Patent No. 787,175 for preparing a bromomethyl benzanthrone by the action of bromine on 2, 5, or 6-methyl benzanthrone. The starting materials for this halogen methyl benzanthrone are difficult to prepare and moreover lack any great utility in the dyestuff art.

It has now been found that 4,9-dihalomethyl benzanthrone can be made in a novel and efficacious manner with almost quantitative yields. This process involves reacting benzanthrone of the formula

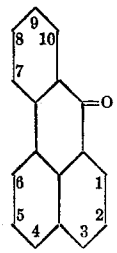

with dihalodimethyl ether in a solvent for the reactants such as concentrated sulfuric acid (96%) while maintaining continuously an excess of the dihalodimethyl ether. It is necessary that this excess of the halomethylating agent be present throughout the reaction in order to prevent the reaction of already halomethylated benzanthrone with unreacted benzanthrone. The interference of such a side reaction may be explained by the very labile hydrogen in the 4-position of the benzanthrone which if not rapidly blocked by a chloromethyl group will react with chloromethylated benzanthrone to yield what is probably a diaryl methane type of compound.

One way of maintaining the necessary excess of the dichlorodimethyl ether and the method which we prefer is to introduce a concentrated sulfuric acid solution of benzanthrone dropwise into a solution of the dichlorodimethyl ether in concentrated sulfuric acid. Other suitable solvents for the reactants may be used in place of the 96% sulfuric acid. The temperature of the solution during the addition to the dichlorodimethyl ether is maintained at from 40° C. to 80° C. and preferably about 68° C. for several hours after completely adding the benzanthrone solution and then dropped to 40° C. for a longer period, for example, 40 hours.

The reaction solution is poured into ice and water precipitating a bright yellow solid which is removed by filtration. This precipitate is then washed until neutral and dried. It is then crystallized from an organic solvent such as monochlorobenzene. The product which is obtained in high yield has the formula

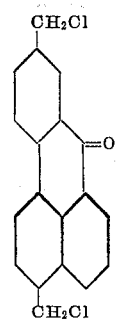

4,9-dichloromethyl benzanthrone

The following example will serve to further illustrate the invention. Unless otherwise stated, the parts are by weight.

Example

A solution of 23.0 g. benzanthrone in 100 cc. 96% sulfuric acid is added dropwise to a solution of 30 cc. dichlorodimethyl ether in 150 cc. 96% sulfuric acid at 62–68° C. in 11 minutes. The temperature was held at 68° C. 2.5 hours and then dropped to 40° C. for 40 hours. After pouring into ice and water, the bright yellow precipitate was filtered, washed neutral and dried. Weight 31.5 g.; M. P. 202–206° C.; crystallized once from monochlorobenzene.

Chlorine calc _____ 21.6
Found _____ 20.1

The 4,9-dichloromethyl benzanthrone may be converted to the pyridinium chloride to produce a yellow compound which is very soluble in water. It also reacts rapidly with thiourea by boiling to produce the di-isothiouronium chloride.

While the halomethyl is believed to attach at the 4 and 9 positions it is possible that other positions may be occupied by one of the halomethyl groups and the formula may thus be represented as follows:

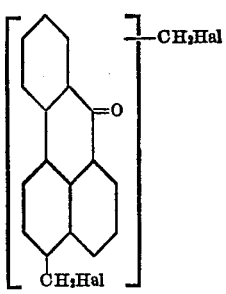

These compounds are useful dyestuff intermediates.

Having now particularly described our invention and set forth the best manner of performing it, what we claim as new is:

1. Dihalobenzanthrone having the formula:

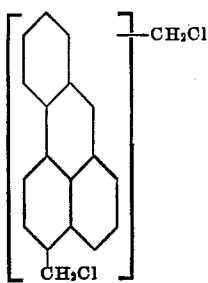

2. The 4,9-dichloromethyl benzanthrone having the formula

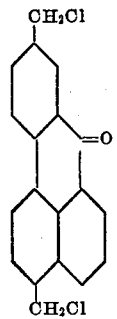

3. The process of producing 4,9-dichloromethyl benzanthrone which comprises reacting benzanthrone with an excess of dichlorodimethyl ether in a solvent for the reactants at an initial temperature of 62° C. to 68° C. which is maintained for several hours and then dropped to 40° C. for a longer period.

4. The process of producing 4,9-dichloromethyl benzanthrone which comprises introducing a concentrated sulfuric acid solution of benzanthrone slowly into concentrated sulfuric acid solution of dichlorodimethyl ether containing an excess of the latter, maintaining the temperature at 62–68° C. for several hours and dropping it to 40° C. for a longer period.

DAVID I. RANDALL.
SAUL R. BUC.

No references cited.